Patented July 4, 1950

2,514,324

UNITED STATES PATENT OFFICE 2,514,324

PREPARATION OF CELLULATED GLASS BODIES

Walter D. Ford, Port Allegany, Pa., assignor to Pittsburgh Corning Corporation, Allegheny County, Pa., a corporation of Pennsylvania No Drawing. Application January 12, 1949, Serial No. 70,602

4 Claims. (Cl. 106—40)

The present invention relates to the preparation of cellular bodies suitable for use as thermal insulation, as buoyant elements in life rafts, floats for fish nets and for other purposes of similar nature. In particular, the invention relates to the preparation of cellular bodies by sintering a mixture of finely pulverized glass and an agent thermally reactive, to produce bloating gases in the sintered mass.

One object of the invention is to provide a process of preparing cellular glass from pulverulent glass and a gassing agent by sintering powdered glass in the presence of a gassing agent in which cellular bodies of light weight, uniform structure and completely sealed cells can be obtained economically and without adhesion to the walls of the molds in which the cellular bodies are formed.

These and other objects of the invention will be apparent from consideration of the following specification and accompanying claims.

It has heretofore been proposed to form cellular glass bodies by heating, to sintering temperature, a mixture of finely pulverized glass and a small amount of a pulverulent gassing agent; such as carbon black, calcium carbonate, or the like. In order to assure smooth and uniform cellulation of this product, when the mixture is heated, it is also customary to incorporate with the mixture a small amount of antimony trioxide. When such mixture is placed in a suitable refractory mold in appropriate amount and heated to a temperature slightly above the sintering point of the glass content, the particles of glass become welded together without complete fusion. Closed pores are thus formed and, simultaneously, chemical reaction of the gassing agent occurs to form gases in gradually increasing volume which expand the pores in which they are entrapped, to form a bloated body of low density and consisting of a myriad of tiny cells or bubbles of glass, in a coherent froth-like mass. Such bodies, by reason of their cellular structure, are of high insulating value against the transmission of heat, and are also impervious to gases, vapors and liquids. The bodies, therefore, are suitable for use in place of cork or asbestos as a heat insulating medium and, because of their resistance to permeation by moisture, chemical agencies, resistance to fire, vermin, and other agencies of deterioration, are in many respects superior to the materials which they replace. The low density also admits of the use of the material as a packing or buoyant element in life rafts, buoys, floats for fish nets and many other similar purposes.

The process, as thus outlined, has heretofore been brought, in many respects, to a high degree of perfection. However, difficulty has heretofore been experienced as a result of a tendency of the mixture to adhere, during the bloating operation, to the surfaces of the molds in which the mixture is confined and formed. Great care has been exercised in the coating of the molds with a suitable parting agent designed to overcome the adhesion, but still, difficulty has persisted.

The present invention is based, in part, upon the discovery that this adhesion between the cellulating mass and the molds is due, at least in part, to the presence of the antimony trioxide employed to promote cellulation. It seems to be, in part, evaporated before cellulation and, in some way, acts at the glass-mold interface to produce adhesion. It has now been found that the difficulty can be substantially or completely obviated, by replacement of the antimony trioxide by a carefully regulated amount of alkaline earth sulfate, notably the sulfate of calcium which is actually ground up or thoroughly admixed with the powdered glass and carbon. The resultant product compares well, in uniformity and degree of cellulation, with the conventionally prepared material.

In the operation of the invention, a glass of conventional formulation may be employed. For example, it may comprise ordinary lime soda glass such as is employed in windows, and which consists essentially of silica, lime and soda ash in appropriate amounts, as is well understood. This glass may also be modified by the inclusion of certain amounts of other ingredients, such as alumina, magnesium, borax, etc. A part of the soda ash, constituting the source of alkali metal in the glass, may also be replaced with sodium sulfate, which probably is largely decomposed to form sodium oxide during the fusion of the raw batch to form the glass.

The glass is finely pulverized, for example, to particle size, such that it will pass a screen of 200 mesh, or even 300 or 400 mesh per square inch. This finely pulverized material may be ground with the gassing agent, e. g., finely divided carbon; such as lamp black, carbon blacks, e. g., channel black, powdered coal, powdered charcoal, powdered graphite, or any other form of finely powdered carbon that will be combustible. The amount of finely divided carbonaceous material is susceptible of certain variation but, in any event, the amount required is never very large. (A range of .1 to 1 percent is good.) For example, in lamp black, the ratio will be approximately 0.5 to 1 percent, although slightly larger or smaller amounts may be employed. With carbon black, the ratio is even smaller, e. g., .15 to .2 percent.

The amount of alkaline earth sulfate which is added should also be carefully controlled. For example, excellent results are obtained with 0.1 percent of $CaSO_4 \cdot \frac{1}{2}H_2O$. However, this amount may be increased slightly; for example, to 0.2 percent or possibly even slightly more. The calcium sulfate may be in substantially any desired state of hydration; it may be anhydrous or it may comprise the half hydrate of the formula $CaSO_4 \cdot \frac{1}{2}H_2O$. Since the anhydrous or partially hydrated material tends to absorb water and, therefore, undergo change in composition upon exposure to air before or after incorporation with the glass, the dihydrate of the formula $CaSO_4 \cdot 2H_2O$ is to be preferred. The ratio of the calcium sulfate above given is based upon the use of the half hydrate ($CaSO_4 \cdot \frac{1}{2}H_2O$). Necessary adjustment for the difference in molecular weight of the anhydrous material or the di-hydrate can readily be calculated. Usually, quite satisfactory results can be attained by the use of 0.12 percent of the di-hydrate which is the equivalent of 0.1 percent of the half hydrate.

The components of the mixture above described are very carefully admixed; for example, by gradual or periodic addition of the carbon and calcium sulfate to the glass cullet as it is being ground upon the ball mill.

The pulverized material is placed in a suitable mold, such as a sheet steel mold, formed of a highly refractory nickel-chromium alloy steel and comprising upper and lower sections similar in structure to conventional bread pans, one of which may be inverted over the other to form a closed container. This mold is preliminarily coated, on its inner surface, with a film of a parting agent such as a mixture of clay and aluminum hydrate, in the form of a water slurry to which an organic binder such as dextrine has been added. Preferably, the amount of mixture is adjusted, approximately, to one-seventh the volume of the mold. When so adjusted, the resultant cellulated product will just fill the mold. The molds are heated in a convenient manner, for example, in a roller hearth type furnace which operates continuously. The powdered mixture is, itself, highly resistant to transmission of heat and, therefore, the heat progresses relatively slowly through the mass, usually requiring several hours to reach completion. The temperature should reach approximately 1600, 1650 or 1750° F., depending somewhat upon the nature of the glass employed as a source of raw material.

At the conclusion of the heating and cellulating operation, the product is partially cooled, the molds removed and the blocks or slabs then subjected to a slow and careful annealing operation with gradually reducing temperatures over a period of several hours. The resultant product, where it contacts with the mold surfaces, is smooth and free from holes, such as are likely to characterize products prepared from mixtures containing antimony trioxide as an aid to the cellulation. The product, preferably in the form of slabs, can be cut to size and shape and is suitable for the same uses as the conventional product in which antimony trioxide is employed. The cells are closed and the heat insulation value is substantially the same as that of the conventional product.

The invention particularly contemplates the use of calcium sulfate as the promoting agent, but the use of other alkaline earth metal sulfates, such as barium sulfate or the like, is also contemplated.

Indeed, most, if not all, of the sulfates of alkaline earth metals can be so employed. The following constitute some of the sulfates which have been tested and found effective:

Sodium sulfate ($Na_2SO_4$, Salt Cake)
Lithium sulfate ($Li_2SO_4 \cdot H_2O$, C. P.)
Calcium sulfate ($CaSO_4 \cdot \frac{1}{2}H_2O$, plaster of Paris)
Barium sulfate ($BaSO_4$, C. P.)
Zinc sulfate ($ZnSO_4 \cdot 7H_2O$, C. P.)
Aluminum sulfate ($Al_2(SO_4)_3 \cdot 18H_2O$, C. P.)
Titanium sulfate ($Ti(SO_4)_2 \cdot 9H_2O$, Pure)
Chromium sulfate ($Cr_2(SO_4)_3 \cdot 5H_2O$ C. P.)
Manganous sulfate ($MnSO_4 \cdot H_2O$, C. P.)
Ferric sulfate ($Fe_2(SO_4)_3 \cdot xH_2O$, C. P.)
Cobaltous sulfate ($CoSO_4 \cdot 7H_2O$, C. P.)
Nickel sulfate ($NiSO_4 \cdot 6H_2O$, C. P.)

The following data are taken from a series of tests conducted to determine the synergistic effect of each of the foregoing sulfates in a standard mixture of finely pulverized glass, containing 0.5% of lamp black:

| Sulfate | Per Cent | Cellulation | Cell Size | Cell Structure |
|---|---|---|---|---|
| | | Per cent | | |
| Standard | | 100 | Normal | Good. |
| $Na_2SO_4$ | 0.1 | 110 | Slightly larger than normal. | Do. |
| Do | 0.2 | 115 | do | Do. |
| $Li_2SO_4 \cdot H_2O$ | 0.1 | 105 | Normal | Do. |
| Do | 0.2 | 110 | do | Do. |
| $CaSO_4 \cdot \frac{1}{2}H_2O$ | 0.2 | 125 | do | Do. |
| Do | 0.4 | 135 | do | Do. |
| $BaSO_4$ | 0.2 | 110 | do | Do. |
| Do | 0.4 | 130 | do | Do. |
| Do | 0.8 | 135 | Large | Irregular and open. |
| $Al_2(SO_4)_3 \cdot 18H_2O$ | 0.1 | 105 | Normal | Good. |
| Do | 0.2 | 110 | do | Do. |
| Do | 0.4 | 115 | Slightly larger | Do. |
| Do | 0.8 | 140 | Large | Slightly irregular. |
| $Ti(SO_4)_2 \cdot 9H_2O$ | 0.2 | 110 | Normal | Good. |
| Do | 0.4 | 120 | do | Do. |
| Do | 0.8 | 125 | Large | Slightly irregular some open cells. |
| $ZnSO_4 \cdot 7H_2O$ | 0.2 | 110 | Normal | Good. |
| Do | 0.4 | 120 | do | Do. |
| Do | 0.8 | 150 | Large | Do. |
| $Cr_2(SO_4)_3 \cdot 5H_2O$ | 0.1 | 100 | Normal | Do. |
| Do | 0.2 | 110 | do | Do. |
| Do | 0.4 | 125 | Slightly larger | Do. |
| Do | 0.8 | 150 | Large | Slightly irregular. |
| $MnSO_4 \cdot H_2O$ | 0.1 | 110 | Normal | Good. |
| Do | 0.2 | 120 | do | Do. |
| Do | 0.4 | 145 | do | Do. |
| $Fe_2(SO_4)_3 \cdot xH_2O$ | 0.2 | 100 | do | Do. |
| Do | 0.4 | 120 | do | Do. |
| $CoSO_4 \cdot 7H_2O$ | 0.1 | 110 | do | Do. |
| Do | 0.2 | 115 | do | Do. |
| Do | 0.4 | 120 | do | Do. |
| Do | 0.8 | 145 | Slightly larger | Do. |
| $NiSO_4 \cdot 6H_2O$ | 0.1 | 100 | Normal | Do. |
| Do | 0.2 | 115 | do | Do. |
| Do | 0.4 | 135 | do | Do. |
| Do | 0.8 | 150 | do | Do. |

The forms of the invention herein disclosed are to be considered merely as exemplary. It will be apparent to those skilled in the art that numerous modifications may be made therein, without departing from the spirit of the invention or the scope of the appended claims.

This application is a continuation-in-part of my co-pending application, Serial No. 590,116, filed April 24, 1945, now abandoned, and entitled Preparation of Cellulated Glass Bodies.

I claim:

1. A process of forming cellular glass of uniform structure, having closed cells, which comprises admixing glass, pulverized to pass a screen of 200 mesh, with approximately 0.5 percent of finely divided carbon and about 0.1 to 0.2 percent of calcium sulfate calculated as ½ hydrate, placing the mixture in molds and heating the mixture to the sintering point of the glass to form coherent cellular bodies, and cooling and annealing the bodies.

2. The process as defined in claim 1 in which the mixture is heated to a temperature about 200° F. above the initial softening point of the glass.

3. A process of forming cellular glass of uniform structure, which comprises admixing pulverulent glass with finely divided carbon in amounts of 0.1% to 1.0% by weight of the mixture and 0.1% to 0.4% by weight of an alkaline earth metal sulfate, placing the mixture in a closed mold and subjecting it to heat about 200° F. above the sintering point, and subsequently annealing the product.

4. A process as defined in claim 3 in which the temperature of heating is approximately 1600° to 1650° F.

WALTER D. FORD.

REFERENCES CITED

The following references are of record in the file of this patent:

FOREIGN PATENTS

| Number | Country | Date |
| --- | --- | --- |
| 447,805 | Great Britain | 1936 |